United States Patent
Wei

(10) Patent No.: US 10,500,493 B2
(45) Date of Patent: Dec. 10, 2019

(54) INFORMATION PROCESSING METHOD AND APPARATUS, ELECTRONIC DEVICE, AND STORAGE MEDIUM

(71) Applicant: NETEASE (HANGZHOU) NETWORK CO., LTD, Zhejiang (CN)

(72) Inventor: Yiming Wei, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 16/059,067

(22) Filed: Aug. 9, 2018

(65) Prior Publication Data
US 2019/0091574 A1 Mar. 28, 2019

(30) Foreign Application Priority Data
Sep. 28, 2017 (CN) .......................... 2017 1 0899023

(51) Int. Cl.
*A63F 13/5375* (2014.01)
*A63F 13/42* (2014.01)
(Continued)

(52) U.S. Cl.
CPC ...... *A63F 13/5375* (2014.09); *A63F 13/2145* (2014.09); *A63F 13/42* (2014.09); *A63F 13/5378* (2014.09)

(58) Field of Classification Search
CPC .............. A63F 13/5375; A63F 13/5378; A63F 13/2145; A63F 13/42
(Continued)

(56) References Cited

U.S. PATENT DOCUMENTS 9,868,062 B2 * 1/2018 Vincent .................. G06F 3/0338
9,937,416 B2 * 4/2018 Ayoub .................... A63F 13/06
(Continued)

FOREIGN PATENT DOCUMENTS

| CN | 105094345 A | 11/2015 |
|---|---|---|
| CN | 105786245 A | 7/2016 |

(Continued)

OTHER PUBLICATIONS

Tampatec, "Top Android Game Apps on Nexus Tablet Review" Oct. 24, 2012.*
(Continued)

*Primary Examiner* — Michael A Cuff
(74) *Attorney, Agent, or Firm* — Gang Yu

(57) ABSTRACT

An information processing method is provided. The method includes: a motion controller, including an area assisting object and an operation assisting object, is provided on the graphical user interface; when detecting a touch sliding operation acting on the operation assisting object, the operation assisting object is controlled to move along a motion track of a touch point of the touch sliding operation within a predetermined range, and the virtual character is controlled to move in the game scene according to a movement of the operation assisting object; when detecting a preset interaction object exists within a preset distance from the virtual character in the game scene, the operation assisting object is configured to be a temporary interaction control; and when detecting an interaction triggering operation on the temporary interaction control, the virtual character is controlled to perform a preset operation on the preset interaction object.

20 Claims, 4 Drawing Sheets

(51) Int. Cl.
*A63F 13/5378* (2014.01)
*A63F 13/2145* (2014.01)

(58) Field of Classification Search
USPC .......................................................... 463/31
See application file for complete search history.

(56) References Cited

U.S. PATENT DOCUMENTS

| | | | | |
|---|---|---|---|---|
| 10,088,993 B2* | 10/2018 | Hall | ..................... | G06F 3/04817 |
| 10,146,343 B2* | 12/2018 | Sawada | ................. | G06F 3/0488 |
| 10,268,364 B2* | 4/2019 | Park | ..................... | G06F 3/04883 |
| 10,386,988 B1* | 8/2019 | Koh | ..................... | G06F 3/04815 |
| 2011/0285636 A1* | 11/2011 | Howard | ............. | G06F 3/04815 |
| | | | | 345/173 |
| 2011/0300934 A1* | 12/2011 | Toy | ..................... | A63F 13/2145 |
| | | | | 463/31 |
| 2012/0242590 A1* | 9/2012 | Baccichet | ............ | G06F 3/0488 |
| | | | | 345/173 |
| 2013/0316813 A1 | 11/2013 | Derome | | |
| 2015/0051000 A1* | 2/2015 | Henn | ..................... | A63F 13/35 |
| | | | | 463/42 |
| 2015/0130836 A1* | 5/2015 | Anderson | ............ | G06T 19/006 |
| | | | | 345/633 |
| 2016/0220903 A1* | 8/2016 | Miller | ................... | A63F 13/537 |
| 2018/0311582 A1* | 11/2018 | Gerhard | ................ | A63F 13/53 |

FOREIGN PATENT DOCUMENTS

| | | |
|---|---|---|
| CN | 106951178 A | 7/2017 |
| CN | 107185231 A | 9/2017 |
| WO | 2012135747 A1 | 10/2012 |

OTHER PUBLICATIONS

Search report of CN Priority application No. 201710899023.4 filed on Sep. 28, 2017, dated Aug. 10, 2018.

* cited by examiner

INFORMATION PROCESSING METHOD AND APPARATUS, ELECTRONIC DEVICE, AND STORAGE MEDIUM

The present disclosure claims priority of Chinese Patent Application No. 201710899023.4, filed on Sep. 28, 2017 and named after "Information Processing Method and Apparatus, Electronic Device, and Storage Medium". Contents of the present disclosure are hereby incorporated by reference in entirety of the Chinese Patent Application.

TECHNICAL FIELD

The present disclosure relates to the technical field of games, and in particular to an information processing method and apparatus, an electronic device, and a storage medium.

BACKGROUND

With the development of mobile smart terminals and the game industry, a large number of mobile games with different themes have emerged to meet needs of users. In some games, an interaction between a game character and an item or prop in a game scene is often completed by a temporary pop-up button. At least one finger of a player needs to move for a long distance to complete following operations such as prop picking operation, non-player character (NPC) dialoguing operation, and doors and windows switching through executing a click operation.

SUMMARY

At least one embodiment of the present disclosure provides an information processing method and apparatus, an electronic device, and a storage medium, so as at least to partially overcome, to some degree, at least one problem due to limitations and disadvantages of the related art.

In one embodiment of the present disclosure, an information processing method is provided by executing a software application on a processor of a mobile terminal and rendering a graphical user interface on a touch display screen of the mobile terminal. Contents displayed by the graphical user interface at least partially include a game scene and at least partially include a virtual character. The method includes that:

providing a motion controller on the graphical user interface, the motion controller including an area assisting object and an operation assisting object of which an initial position is within a range of the area assisting object; when detecting a touch sliding operation acting on the operation assisting object, controlling the operation assisting object to move along a motion track of a touch point of the touch sliding operation within a predetermined range, and controlling the virtual character to move in the game scene according to a movement of the operation assisting object; when detecting a preset interaction object exists within a preset distance from the virtual character in the game scene, configuring the operation assisting object to be a temporary interaction control; and when detecting an interaction triggering operation on the temporary interaction control, controlling the virtual character to perform a preset operation on the preset interaction object.

In another embodiment of the present disclosure, an information processing apparatus is provided by executing a software application on a processor of a mobile terminal and rendering a graphical user interface on a touch display screen of the mobile terminal. Contents displayed by the graphical user interface at least partially include a game scene and at least partially include a virtual character. The apparatus includes:

a first providing element, configured to provide a motion controller on the graphical user interface, the motion controller including an area assisting object and an operation assisting object of which an initial position is within a range of the area assisting object; a first detection element, configured to control, detecting when a touch sliding operation acting on the operation assisting object, the operation assisting object to move along a motion track of a touch point of the touch sliding operation within a predetermined range, and control the virtual character to move in the game scene according to a movement of the operation assisting object; a second detection element, configured to configure, when detecting a preset interaction object exists within a preset distance from the virtual character in the game scene, the operation assisting object to be a temporary interaction control; and a third detection element, configured to control, when detecting an interaction triggering operation on the temporary interaction control, the virtual character to perform a preset operation on the preset interaction object.

In another embodiment of the present disclosure, an electronic device is provided. The electronic device includes: at least one processor; and at least one memory, configured to store at least one executable instruction of the at least one processor, and the at least one processor is configured to execute the information processing method by executing the at least one executable instruction.

In another embodiment of the present disclosure, a computer-readable storage medium is provided, on which at least one computer program may be stored, and the at least one computer program may be executed by at least one processor to implement the information processing method.

DETAILED DESCRIPTION

In order to make those skilled in the art better understand the solutions of the present disclosure, the technical solutions in the embodiments of the present disclosure will be described clearly and completely below with reference to the accompanying drawings in the embodiments of the present disclosure. Obviously, the described embodiments are a part of the present disclosure and not all of the embodiments. All other embodiments obtained by persons of ordinary skill in the art based on the embodiments of the present disclosure without creative efforts shall fall within the protection scope of the present disclosure.

The solution in the related art has the disadvantages as follows.

In one aspect, a new button temporarily popped up may occupy more vision space and vision loads, and meanwhile, a player needs to move a thumb for touching the button, so that interaction efficiency would be reduced.

In another aspect, under the condition that a virtual backpack capacity of a game character is limited, auto-selection and pick up cannot be performed.

In another aspect, other buttons near the new button are easily touched falsely during operations.

In another aspect, the interaction method provided in the related art would affect operation coherence, and user experience is bad.

In an embodiment of the present disclosure, an embodiment of an information processing method is provided. It should be noted that the steps shown in the flowchart of the drawings may be performed in a computer system such as a set of computer-executable instructions, and although a logical order is shown in the flowchart, in some cases, the illustrated or described steps may be performed in an order other than the above.

Figure 1:
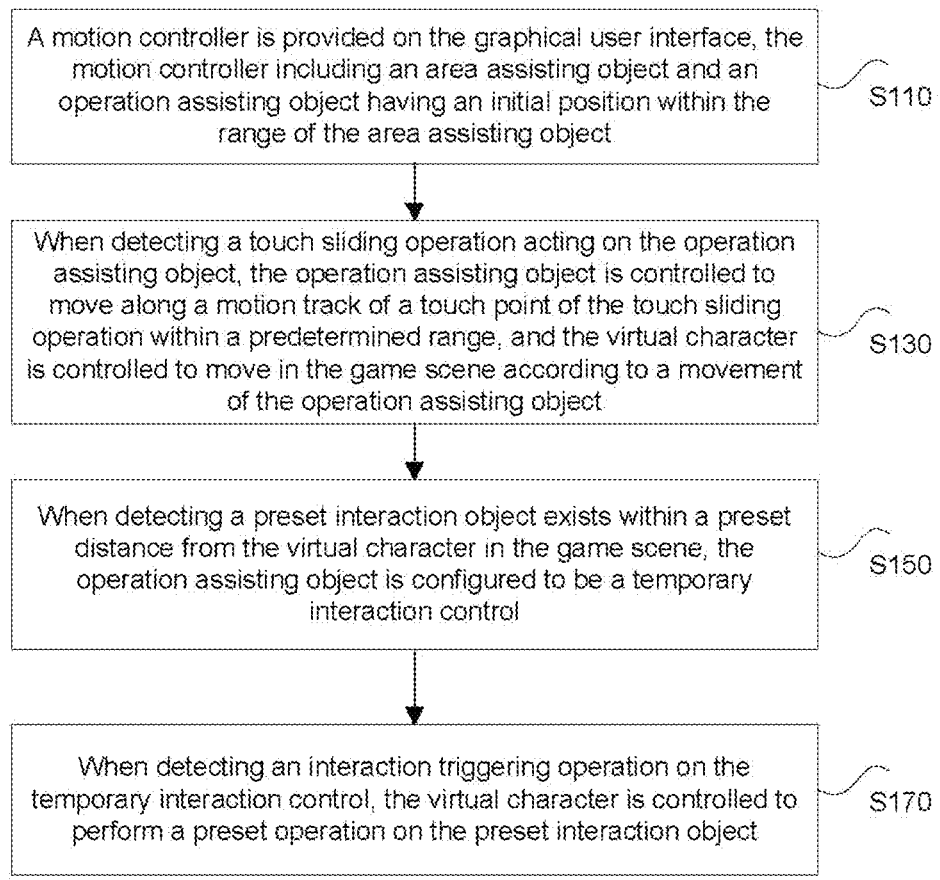
FIG. 1 is a flowchart of an information processing method according to an embodiment of the present disclosure.

FIG. 1 is a flowchart of an information processing method according to an embodiment of the present disclosure. The information processing method is provided by executing a software application on a processor of a mobile terminal and rendering a graphical user interface on a touch display screen of the mobile terminal. Contents displayed by the graphical user interface at least partially include a game scene and at least partially include a virtual character. The method may include the steps as follows.

At step S110, a motion controller is provided on the graphical user interface, the motion controller including an area assisting object and an operation assisting object having an initial position within the range of the area assisting object.

At step S130, when detecting a touch sliding operation acting on the operation assisting object, the operation assisting object is controlled to move along a motion track of a touch point of the touch sliding operation within a predetermined range, and the virtual character is controlled to move in the game scene according to a movement of the operation assisting object.

At step S150, when detecting a preset interaction object exists within a preset distance from the virtual character in the game scene, the operation assisting object is configured to be a temporary interaction control.

At step S170, when detecting an interaction triggering operation on the temporary interaction control, the virtual character is controlled to perform a preset operation on the preset interaction object.

The information processing method provided in the present exemplary embodiment may achieve the technical effects as follows.

In one aspect, it is unnecessary to provide a temporary pop-up button to control the interaction between a game character and an item or prop in the game scene, thereby saving a display space of a terminal screen.

In another aspect, interaction efficiency would be improved.

In another aspect, mis-operation caused by switching a touch operation in different operation areas frequently would be avoided, and the operation would be more coherent and simple.

The information processing method provided in the present exemplary embodiment at least partially solves technical problems that an interaction operation button for the interaction between a player character and an interactive object in a game scene of a mobile terminal game occupies a screen space of a mobile terminal and operations are inconvenient and non-coherent.

In the following, the steps of the information processing method in the present exemplary embodiment will be further described.

In the present exemplary embodiment, an information processing method is provided by executing a software application on a processor of a mobile terminal and rendering a graphical user interface on a touch display screen of the mobile terminal. Contents displayed by the graphical user interface at least partially include a game scene and at least partially include a virtual character.

Figure 2:
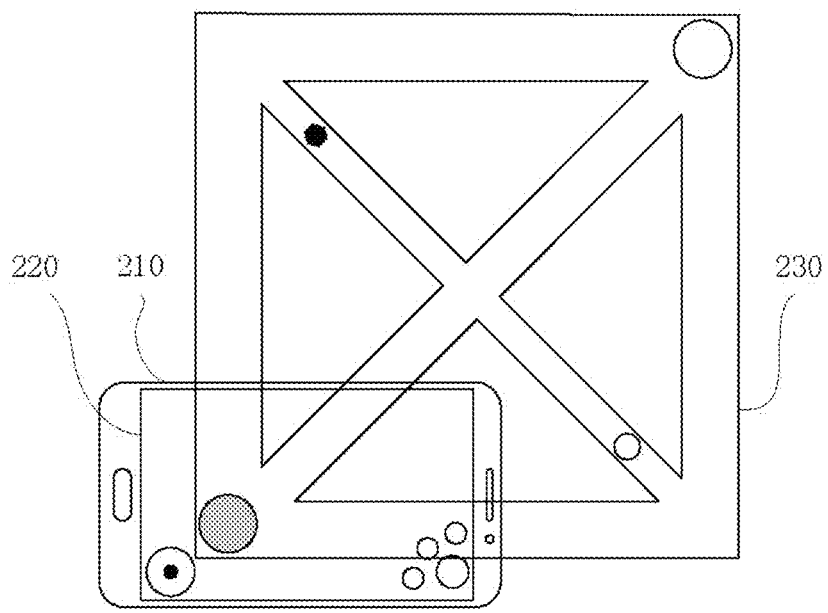
FIG. 2 is a schematic diagram of a game scene according to an embodiment of the present disclosure.

Contents presented by the graphical user interface may include an entire part of the game scene, and may also be part of the game scene. For example, as shown in FIG. 2, since a game scene 230 is relatively large, local content of the game scene 230 is displayed on a graphical user interface 220 of a mobile terminal 210 during the game. The game scene may be a square shape as shown in FIG. 2 or other shapes (e.g., circulars, etc.), and the present disclosure is not limited to the shape of the game scene.

Contents presented by the graphical user interface may include an entire part of the virtual character or a local part of the virtual character. For example, in a third person perspective game, contents presented by the graphical user interface may include the entire part of the virtual character such as a virtual character 350 shown in FIG. 3. For another example, in a first person perspective game, contents presented by the graphical user interface may include part of the virtual character.

In an optional embodiment, the graphical user interface includes a mini-map. The mini-map may be a thumbnail of an entire game scene (e.g., 310 in FIG. 3), or may be a thumbnail of a local part of the game scene. Different details may be displayed in the mini-map for different types of games (e.g., details of maps that may be used for assisting players in determining positions of virtual characters controlled by the players in the game world, real-time positions of ally characters, real-time positions of enemy characters, vision information of a current game scene, etc.). The mini-map may be displayed at the upper left, upper right, or other positions on the graphical user interface. The present exemplary embodiment is not limited to the position of displaying the mini-map.

Figure 3:
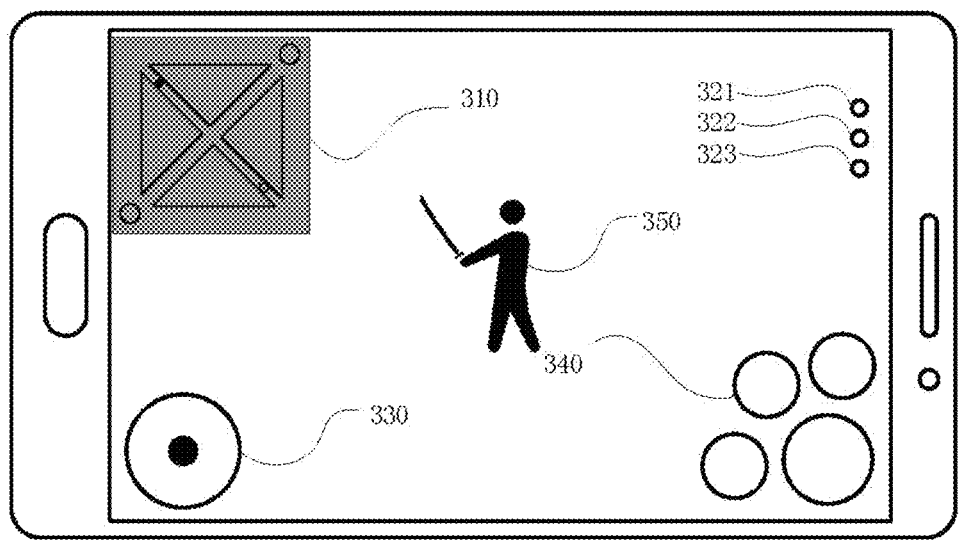
FIG. 3 is a schematic diagram of a graphical user interface of a mobile terminal according to an embodiment of the present disclosure.

In an optional embodiment, the graphical user interface includes at least one signal icon (e.g., signal icons 321, 322, 323 in FIG. 3). The at least one signal icon may be located at the upper left, upper right, or other positions of the graphical interface. The at least one signal icon may also be located on the same or different sides of the graphical user interface. The present exemplary embodiment is not limited to the position for locating the at least one signal icon.

At step S110, a motion controller is provided on the graphical user interface, the motion controller including an area assisting object and an operation assisting object having an initial position within the range of the area assisting object.

Figure 4:
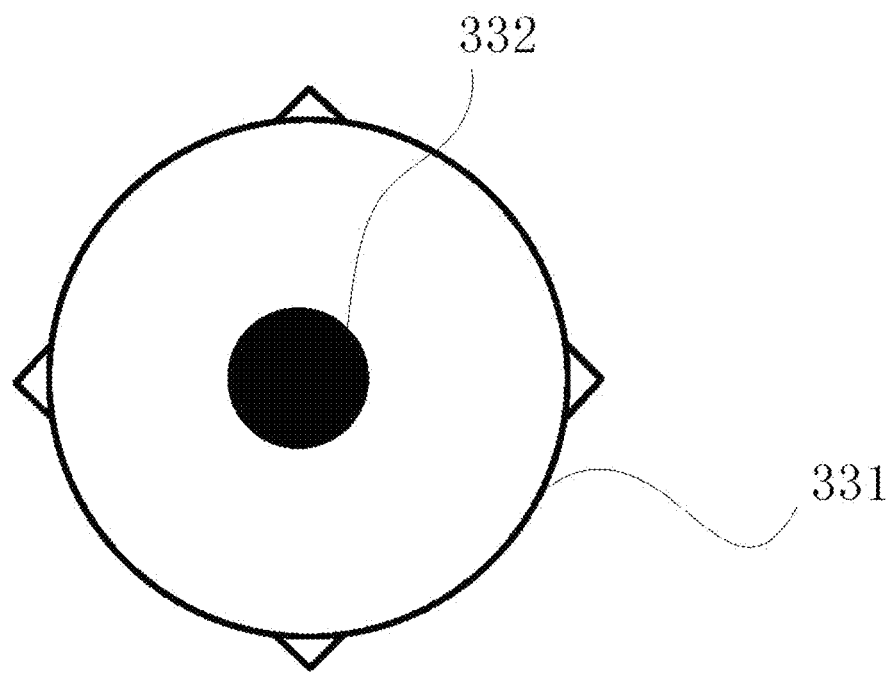
FIG. 4 is a schematic diagram of a motion controller according to an embodiment of the present disclosure.

As shown in FIG. 3, a motion controller 330 may be provided on the graphical user interface. As shown in FIG. 4, the motion controller 330 includes an area assisting object 331 and an operation assisting object 332 of which an initial position is within a range of the area assisting object. Both the area assisting object 331 and the operation assisting object 332 are circular, and the initial position of the operation assisting object 332 is at a center of the area assisting object 331. The area assisting object 331 may be generated at a predetermined position on the graphical user interface, or may also be generated at a starting position of a touch operation.

In an optional embodiment, a shape of the area assisting object 331 is circular as a whole, and is provided with a direction indicator on a circumference of the circular. The number of the direction indicator may be one direction indicator or a plurality of direction indicators, as shown in FIG. 4, for indicating a moving direction of a virtual character corresponding to a current position of the operation assisting object 332. In the embodiment shown in FIG. 4, the direction indicator is composed of up, down, left and right arrows, which respectively correspond to up, down, left, and right directions. A player may be prompted by specially rendering the direction indicator corresponding to the moving direction of the current virtual character. In an optional embodiment, a single indicator may be adopted, and this single indicator is controlled to move in a periphery of the area assisting object according to the position of the operation assisting object, so that the direction indicated by the single indicator is consistent with the moving direction of the virtual character.

In an optional embodiment shown in FIG. 4, the shape of the operation assisting object 332 is a circular. An initial position of operation assisting object is located at the center of the area assisting object 331.

In an optional embodiment, the shape of at least one of the area assisting object 331 and the operation assisting object 332 is oval, triangle, rectangle, hexagon, other polygon, etc., or irregular shape (e.g., horseshoe, tiger head, bear paws, etc.).

In an optional implementation manner, the operation assisting object 332 is located at a predetermined position in the area assisting object 331, and is not limited to a center or a mass center position of the area assisting object 331.

At step S130, when detecting a touch sliding operation acting on the operation assisting object, the operation assisting object is controlled to move along a motion track of a touch point of the touch sliding operation within a predetermined range, and the virtual character is controlled to move in the game scene according to a movement of the operation assisting object.

Figure 5:
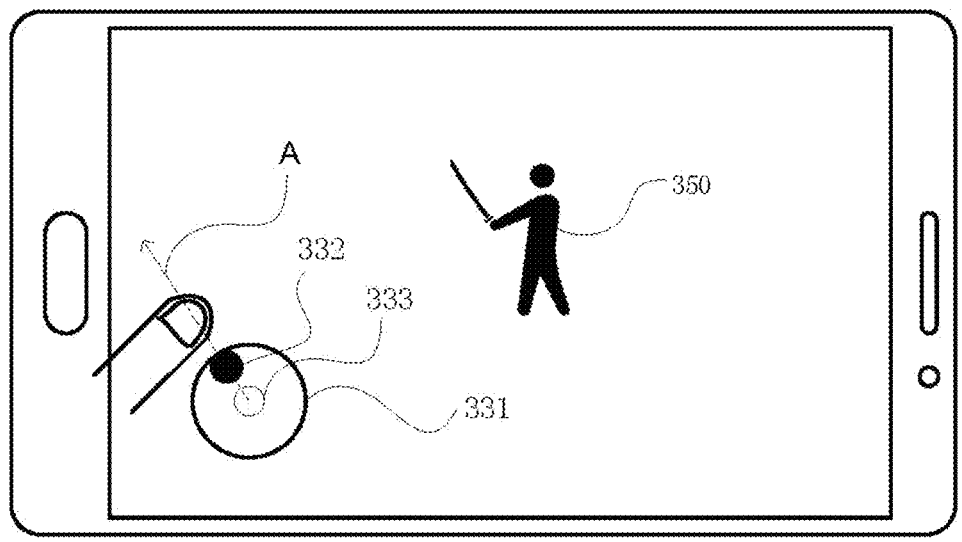
FIG. 5 and FIG. 6 are schematic diagrams of motion control according to an embodiment of the present disclosure.

For example, as shown in FIG. 5, when detecting a touch sliding operation acting on the operation assisting object 332, the operation assisting object 332 is controlled to move along a motion track of a touch point of the touch sliding operation within the range of the area assisting object 331. The touch point generating through executing, by at least one finger of a player, the touch sliding operation on the screen of the mobile terminal moves from a starting position 333 of the operation assisting object 332 to the outside of the area assisting object 331. When the touch point is within the range of the area assisting object 331, the operation assisting object 332 is controlled to move along a motion track of the touch point of the touch sliding operation. When the touch point moves beyond the range of the area assisting object 331, the operation assisting object 332 cannot move beyond the range of the assisting object 331, as shown in FIG. 5. A direction of a direction line A is a direction from the starting position 333 of the operation assisting object 332 to the current touch point, and the operation assisting object 332 is located on the direction line A. When the touch point moves, the position of the operation assisting object 332 may be changed. That is, the direction of the direction line A may be changed. Moreover, the virtual character 350 is controlled to move along a direction corresponding to the direction of the direction line A in the game scene in the game scene.

In an optional embodiment, when detecting a touch sliding event acting on the operation assisting object, the operation assisting object is controlled to move along a motion track of a touch point of the touch sliding operation within a predetermined range, and the virtual character is controlled to move in the game scene according to the movement of the operation assisting object. The predetermined range refers to a circular range having a predetermined length as a radius and centered on a predetermined position in the area assisting object.

Figure 6:
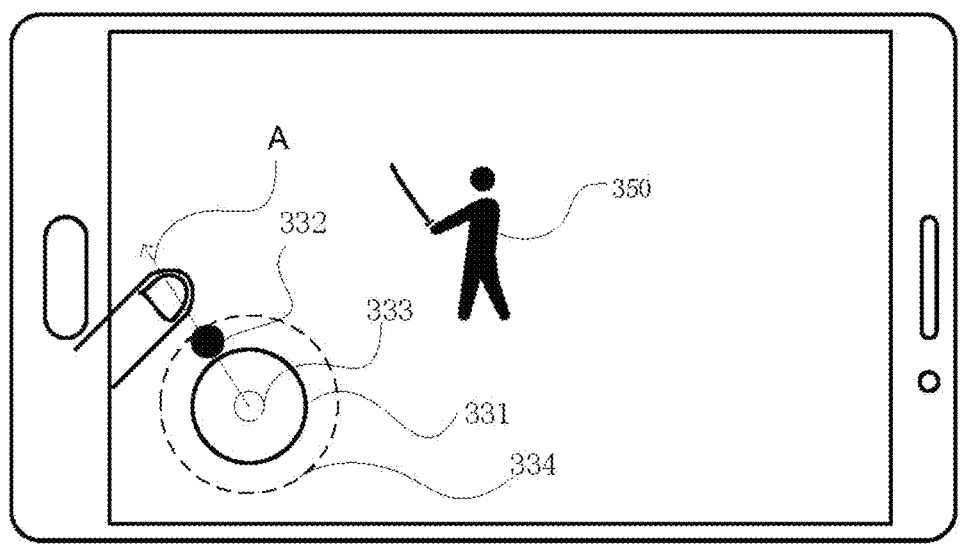

For example, as shown in FIG. 6, when detecting a touch sliding operation acting on the operation assisting object 332, the operation assisting object 332 is controlled to move along a motion track of a touch point of the touch sliding operation within a predetermined range 334. The predetermined range 334 includes one of the following: the range of the area assisting object; and, a circular range having a predetermined length as a radius and centered on a predetermined position in the area assisting object.

The touch point generating through executing, by at least one finger of a player, the touch sliding operation on the screen of the mobile terminal moves from a starting position 333 of the operation assisting object 332 to the outside of the predetermined range 334. When the touch point is within the predetermined range 334, the operation assisting object 332 is controlled to move along a motion track of the touch point of the touch sliding operation. When the touch point moves beyond the predetermined range 334, the operation assisting object 332 cannot move beyond the predetermined range 334. The direction of a direction line A is a direction from the starting position 333 of the operation assisting object 332 to the current touch point, and the operation assisting object 332 is located on the direction line A. When the touch point moves, the position of the operation assisting object 332 may be changed. That is, the direction of the direction line A may be changed. Moreover, the virtual character 350 is controlled to move along a direction corresponding to the direction line A in the game scene.

In an optional embodiment, when one of the distance between the touch point and a center point of the area assisting object 331 and the distance between the touch point and initial position of the operation assisting object 332 is greater than a predetermined distance, the area assisting object 331 and the operation assisting object 332 are controlled to move along with the touch point.

In an optional embodiment, a moving speed of the virtual character 350 is determined according to the distance between the touch point and the center point of the area assisting object 331. For example, as the touch point is farther away from the center point of the area assisting object 331, the moving speed of the virtual character 350 is increasing.

In an optional embodiment, the step of controlling the virtual character to move in the game scene according to the movement of the operation assisting object includes that: a current position of the operation assisting object is determined according to the movement of the operation assisting object, a moving direction is determined according to the current position and a predetermined position in the area assisting object, and the virtual character is controlled to move in the game scene according to the moving direction. The predetermined position includes: an initial position of the operation assisting object in the area assisting object.

For example, as shown in FIG. 5, a moving direction A is determined according to the current position of the operation assisting object 332 and a predetermined position (e.g., initial position 333) in the area assisting object, and then the virtual character 350 is controlled to move in the game scene according to the moving direction A.

At step S150, when detecting a preset interaction object exists within a preset distance from the virtual character in the game scene, the operation assisting object is configured to be a temporary interaction control.

When detecting a preset interaction object exists within a preset distance from the virtual character in the game scene, the operation assisting object is configured to be a temporary interaction control. Specifically, it may be detected whether a preset interactive object exists within a preset distance from the virtual character, or detected whether the virtual character moves in an interaction area of the preset interaction object. The preset interaction object may be props (for example, weapons, ammunition, food, or other supplies), doors, windows, NPCs, and the like. When detecting a preset interaction object exists within a preset distance from the virtual character in the game scene, or detecting the virtual character moves in an interaction area of the preset interaction object, the operation assisting object is configured to be a temporary interaction control. In this way, there is no need to provide a temporary pop-up button to control the interaction between a game character and an item or prop in the game scene, thereby saving a display space of a terminal screen.

In an optional embodiment, after the operation assisting object is configured to be the temporary interaction control, the method further includes that: an operation indicator associated with the preset interaction object is displayed on the graphical user interface.

Figure 7:
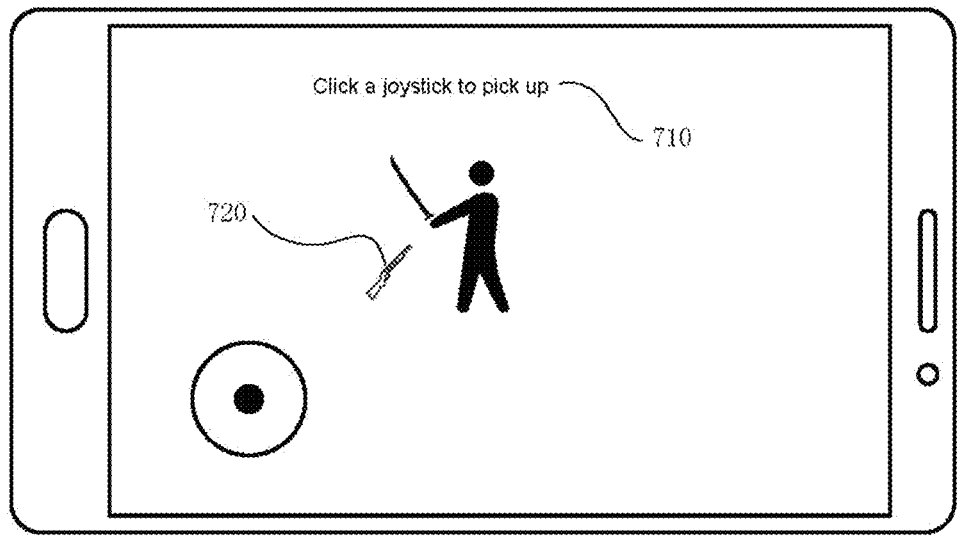
FIG. 7 and FIG. 8 are schematic diagrams of an interaction operation indicator according to an embodiment of the present disclosure.

When detecting a preset interaction object exists within a preset distance from the virtual character in the game scene, the operation assisting object is configured to be a temporary interaction control. Specifically, it may be detected whether a preset interactive object exists within a preset distance from the virtual character, or detected whether the virtual character moves in an interaction area of the preset interaction object. The preset interaction object may be props (for example, weapons, ammunition, food, or other supplies), doors, windows, NPCs, and the like. When detecting a preset interaction object exists within a preset distance from the virtual character in the game scene, or detecting the virtual character moves in an interaction area of the preset interaction object, the operation assisting object is configured to be a temporary interaction control, and an operation indicator associated with the preset interaction object is displayed on the graphical user interface. For example, as shown in FIG. 7, when detecting a preset interaction object 720 exists within a preset distance from the virtual character in the game scene, the operation assisting object is configured to be a temporary interaction control, and an operation indicator 710 associated with the preset interaction object is displayed on the graphical user interface. The preset interaction object 720 may be other interactive objects, such as doors or windows. In this way, an operation indicator "click a joystick to open doors or windows, or click the joystick to close doors or windows" associated with doors or windows may be displayed in the graphic user interface. The operation indicator 710 may be displayed on the upper part of the graphical user interface, and may also be displayed on the right side or other positions of the graphical user interface. The operation indicator 710 may be text instruction information (as shown in FIG. 7), or graphic instruction information (icon instruction information), or a combination of text instruction information and graphic instruction information, which is not limited herein. In this way, guidance instructions for interactive operations would be provided for ease of operation.

In an optional embodiment, after the operation assisting object is configured to be the temporary interaction control, the method further includes that: the operation assisting object is rendered according to at least one preset display parameter associated with the preset interaction object.

Figure 8:
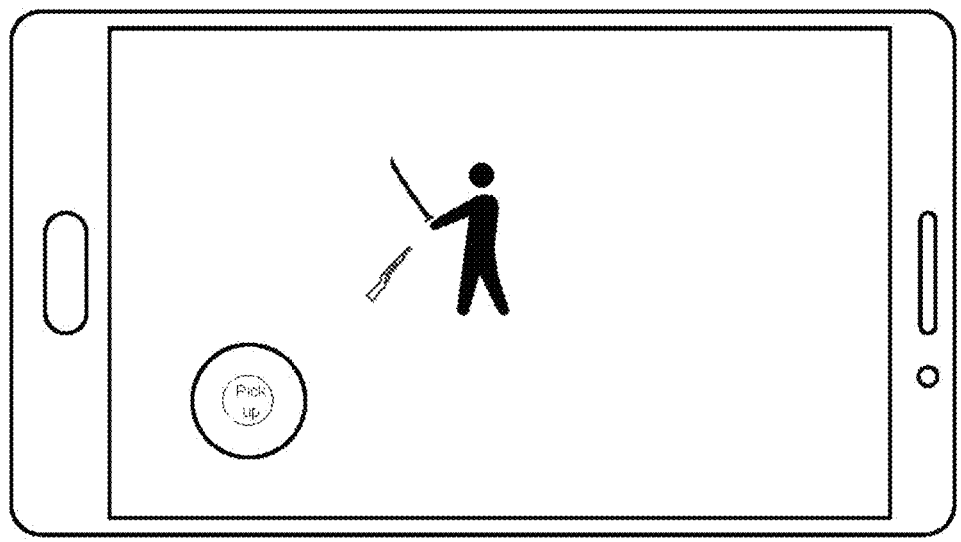

When detecting a preset interaction object exists within a preset distance from the virtual character in the game scene, the operation assisting object is configured to be a temporary interaction control. Specifically, it may be detected whether a preset interactive object exists within a preset distance from the virtual character, or detected whether the virtual character moves in an interaction area of the preset interaction object. The preset interaction object may be props (for example, weapons, ammunition, food, or other supplies), doors, windows, NPCs, and the like. When detecting a preset interaction object exists within a preset distance from the virtual character in the game scene, or detecting the virtual character moves in an interaction area of the preset interaction object, the operation assisting object is configured to be a temporary interaction control, and the operation assisting object is rendered according to at least one preset display parameter associated with the preset interaction object. Specifically, the color, size and shape of the operation assisting object may be rendered according to the preset display parameter associated with the preset interaction object, so that when the operation assisting object is configured to be a temporary interaction control, the area assisting object is distinguished from states at other time points. For example, an operation indicator (including text instruction information or graphic instruction information) may be rendered in the operation assisting object. As shown in FIG. 8, "pick up" may be rendered in the operation assisting object. Optionally, the area assisting object may also be rendered according to at least one preset display parameter associated with the preset interaction object, so that when the operation assisting object is configured to be a temporary interaction control, the area assisting object is distinguished from states at other time points.

At step S170, when detecting an interaction triggering operation on the temporary interaction control, the virtual character is controlled to perform a preset operation on the preset interaction object.

When detecting an interaction triggering operation on the temporary interaction control, the virtual character is controlled to perform a preset operation on the preset interaction object. For example, the interaction triggering operation may be a click operation, a long-press operation, a heavy-press operation or the like. When detecting such an interaction triggering operation, the virtual character is controlled to perform a preset operation on the preset interaction object. In this way, the interaction efficiency is improved, mis-operation caused by switching the touch operation in different operation areas frequently is avoided, and operations are more coherent and simple. The preset operation includes, but is not limited to, an interactive operation such as a pickup operation, a discarding operation, a dialogue operation, an opening operation, a closing operation, and the like. The present disclosure is not limited to the content of the preset operation.

In an optional embodiment, the step of controlling, when detecting an interaction triggering operation on the temporary interaction control, the virtual character to perform a preset operation on the preset interaction object includes that: when detecting an interaction triggering operation on the temporary interaction control, the virtual character is controlled to pick up the preset interaction object.

When detecting an interaction triggering operation on the temporary interaction control, the virtual character is controlled to perform a preset operation on the preset interaction object. For example, the interaction triggering operation may be a click operation, a long-press operation, a heavy-press operation or the like. When detecting such an interaction triggering operation, the virtual character is controlled to perform a preset operation on the preset interaction object. The preset operation may be a pickup operation. For example, the preset interaction object is props (for example, weapons, ammunition, food, or other supplies). When detecting the interaction triggering operation, the virtual character is controlled to pick up a preset interaction object (e.g., pick up a weapon).

In an optional embodiment, the step of controlling, when detecting an interaction triggering operation on the temporary interaction control, the virtual character to perform a preset operation on the preset interaction object includes that: when detecting an interaction triggering operation on the temporary interaction control, the virtual character is controlled to open or close the preset interaction object.

When detecting an interaction triggering operation on the temporary interaction control, the virtual character is controlled to perform a preset operation on the preset interaction object. For example, the interaction triggering operation may be a click operation, a long-press operation, a heavy-press operation or the like. When detecting such an interaction triggering operation, the virtual character is controlled to perform a preset operation on the preset interaction object. The preset operation may be an opening or closing operation. For example, the preset interaction object is an interaction object which may be opened or closed, such as a door, a window or a box. When detecting the interaction triggering operation, the virtual character is controlled to open the preset interaction object (e.g., open a door).

In another embodiment of the present disclosure, an information processing apparatus is also provided by executing a software application on a processor of a mobile terminal and rendering a graphical user interface on a touch display screen of the mobile terminal. Contents displayed by the graphical user interface at least partially include a game scene and at least partially include a virtual character. The apparatus includes:

a first providing element, configured to provide a motion controller on the graphical user interface, the motion controller comprising an area assisting object and an operation assisting object of which an initial position is within a range of the area assisting object;

a first detection element, configured to control, detecting when a touch sliding operation acting on the operation assisting object, the operation assisting object to move along a motion track of a touch point of the touch sliding operation within a predetermined range, and control the virtual character to move in the game scene according to a movement of the operation assisting object;

a second detection element, configured to configure, when detecting a preset interaction object exists within a preset distance from the virtual character in the game scene, the operation assisting object to be a temporary interaction control; and a third detection element, configured to control, when detecting an interaction triggering operation on the temporary interaction control, the virtual character to perform a preset operation on the preset interaction object.

In another embodiment of the present disclosure, an electronic device is also provided. The electronic device includes: a processing component, which may further include at least one processor, and a memory resource represented by at least one memory and configured to store at least one instruction executable by the processing component, such as at least one application program. The at least one application program stored in the at least one memory may include at least one component each corresponding to a set of instructions. In addition, the processing component is configured to execute instructions to perform the above-described information processing method.

The electronic device may also include: a power supply component, configured to perform power management on the executed electronic device; a wired or wireless network interface, configured to connect the electronic device to a network; and an input output (I/O) interface. The electronic device may operate based on an operating system stored in a memory, such as Android, iOS, Windows, Mac OS X, Unix, Linux, FreeBSD, or the like.

In another embodiment of the present disclosure, a computer-readable storage medium is also provided. A program product capable of implementing the above method of the present specification is stored thereon. In some possible implementation manners, various aspects of the present disclosure may also be implemented in the form of a program product, which includes a program code for causing a terminal device to execute the steps according to various exemplary implementation manners of the present disclosure described in the "Exemplary Method" section of the present specification when the program product runs on a terminal device. It may use a portable Compact Disc Read-Only Memory (CD-ROM) and include at least one program code, and may run on a terminal device such as a personal computer. However, the program product of the present disclosure is not limited thereto, and in this document, the readable storage medium may be any tangible medium that contains or stores a program. The program may be used by or in conjunction with an instruction execution system, device, or apparatus.

The program product may employ any combination of one or more readable media. The readable medium may be a readable signal medium or a readable storage medium. The readable storage medium may be, for example but not limited to, an electrical, magnetic, optical, electromagnetic, infrared, or semiconductor system, apparatus, or device, or any combination of the above. More specific examples (non-exhaustive listings) of the readable storage medium include: electrical connectors with one or more wires, portable disks, hard disks, Random Access Memories (RAMs), ROMs, Erasable Programmable Read-Only Memories (EPROMs or flash memories), optical fibers, portable CD-ROMs, optical storage devices, magnetic storage devices, or any suitable combination of the above.

The sequence numbers of the foregoing embodiments of the present disclosure are merely for description and do not represent the advantages and disadvantages of the embodiments.

In the foregoing embodiments of the present disclosure, the description of each embodiment has its own emphasis. For the part not described in detail in one embodiment, reference may be made to the relevant description of other embodiments.

In some embodiments provided by the present disclosure, it shall be understood that the disclosed technical content may be implemented in other modes. For example, the apparatus embodiment described above is schematic. For example, the division of the components or elements is the division of logical functions, and there may be additional division modes during practical implementation. For example, a plurality of elements or assemblies may be combined or integrated to another system, or some characteristics may be omitted or may be not executed; and in addition, displayed or discussed mutual coupling or direct coupling or communication connection may be performed via some interfaces, and indirect coupling or communication connection between apparatuses or elements may be in an electrical form, a mechanical form or other forms.

The elements illustrated as separate components may be or may not be physically separated. Components for element display may be or may not be physical elements. That is, the components may be located at a place or may be distributed on a plurality of network elements. The aims of the solutions of the embodiments may be achieved by selecting some or all elements according to actual requirements.

In addition, all function elements in all embodiments of the present disclosure may be integrated in a processing element, or each element may exist separately and physically, or two or more elements may be integrated in a element. The integrated element may be implemented in a hardware form or may be implemented in a software function element form.

If the integrated element is implemented in the form of a software function element and is sold or used as an independent product, the product may be stored in a computer-readable storage medium. Based on this understanding, the technical solutions of the present disclosure may be substantially embodied in the form of a software product or parts contributing to the traditional art or all or some of the technical solutions may be embodied in the form of a software product, and a computer software product is stored in a storage medium, including a plurality of instructions enabling a computer device (which may be a personal computer, a server or a network device) to execute all or some of the steps of the method according to each embodiment of the present disclosure.

It should be noted that the specification and claims of the present disclosure and terms "first", "second", etc. in the foregoing drawings are used for distinguishing similar objects rather than describing a specific sequence or a precedence order. It will be appreciated that the terms used in such a way may be exchanged under appropriate conditions, in order that the embodiments of the present disclosure described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or elements to clearly list those steps or elements, and other steps or elements which are not clearly listed or are inherent to these processes, methods, products or devices may be included instead.

The above are exemplary implementation manners of the present disclosure, and it should be pointed out that those of ordinary skill in the art can also make several improvements and modifications without departing from the principle of the present disclosure. These improvements and modifications should also be regarded as the scope of protection of the present disclosure.

What is claimed is:

1. An information processing method, provided by executing a software application on a processor of a mobile terminal and rendering a graphical user interface on a touch display screen of the mobile terminal, contents displayed by the graphical user interface at least partially comprising a game scene and at least partially comprising a virtual character, the method comprising:
   providing a motion controller on the graphical user interface, the motion controller comprising an area assisting object and an operation assisting object of which an initial position is within a range of the area assisting object;
   when detecting a touch sliding operation acting on the operation assisting object, controlling the operation assisting object to move along a motion track of a touch point of the touch sliding operation within a predetermined range, and controlling the virtual character to move in the game scene according to a movement of the operation assisting object;
   when detecting a preset interaction object exists within a preset distance from the virtual character in the game scene, configuring the operation assisting object to be a temporary interaction control; and
   when detecting an interaction triggering operation on the temporary interaction control, controlling the virtual character to perform a preset operation on the preset interaction object.

2. The method as claimed in claim 1, wherein when detecting the interaction triggering operation on the temporary interaction control, controlling the virtual character to perform the preset operation on the preset interaction object comprises:
   when detecting the interaction triggering operation on the temporary interaction control, controlling the virtual character to pick up the preset interaction object.

3. The method as claimed in claim 1, wherein when detecting the interaction triggering operation on the temporary interaction control, controlling the virtual character to perform the preset operation on the preset interaction object comprises:
   when detecting the interaction triggering operation on the temporary interaction control, controlling the virtual character to open or close the preset interaction object.

4. The method as claimed in claim 1, wherein after configuring the operation assisting object to be the temporary interaction control, the method further comprises:
   displaying an operation indicator associated with the preset interaction object on the graphical user interface.

5. The method as claimed in claim 4, wherein the operation indicator comprises at least one of the following: text instruction information, graphic instruction information.

6. The method as claimed in claim 1, wherein after configuring the operation assisting object to be the temporary interaction control, the method further comprises:
   rendering the operation assisting object according to at least one preset display parameter associated with the preset interaction object.

7. The method as claimed in claim 6, wherein rendering the operation assisting object according to the at least one preset display parameter associated with the preset interaction object comprises:
   rendering at least one of color, size and shape of the operation assisting object according to the at least one preset display parameter associated with the preset interaction object.

8. The method as claimed in claim 1, further comprising:
   when detecting an ending action of the touch sliding operation, controlling the operation assisting object to be restored to the initial position.

9. The method as claimed in claim 1, wherein controlling the virtual character to move in the game scene according to the movement of the operation assisting object comprises:
   determining a current position of the operation assisting object according to the movement of the operation assisting object;
   determining a moving direction according to the current position and a predetermined position in the area assisting object; and
   controlling the virtual character to move in the game scene according to the moving direction.

10. The method as claimed in claim 9, wherein the predetermined position comprises: an initial position of the operation assisting object in the area assisting object.

11. The method as claimed in claim 1, wherein the predetermined range comprises one of the following: the range of the area assisting object; and a circular range having a predetermined length as a radius and centered on a predetermined position in the area assisting object.

12. An electronic device, comprising:
    at least one processor; and
    at least one memory, configured to store at least one executable instruction of the at least one processor,
    wherein the at least one processor is configured to execute the information processing method as claimed in claim 1 by executing the at least one executable instruction.

13. A computer-readable storage medium, on which at least one computer program is stored, wherein the at least one computer program is executed by at least one processor to implement the information processing method as claimed in claim 1.

14. The method as claimed in claim 1, further comprising:
    when one of a distance between the touch point and a center point of the area assisting object and a distance between the touch point and the initial position of the operation assisting object is greater than a predetermined distance, controlling the area assisting object and the operation assisting object to move along with the touch point.

15. The method as claimed in claim 1, further comprising:
    determining a moving speed of the virtual character according to the distance between the touch point and the center point of the area assisting object.

16. The method as claimed in claim 1, wherein detecting that the preset interaction object exists within a preset distance from the virtual character in the game scene comprises one of the following:
    detecting whether an interactive preset interaction object exists within a preset distance from the virtual character;
    detecting whether the virtual character moves in an interaction area of the preset interaction object.

17. The method as claimed in claim 1, wherein the preset interaction object is one of the following: at least one prop, doors and windows, at least one non-player character.

18. The method as claimed in claim 1, wherein the interaction triggering operation comprises one of the following: a click operation, a long-press operation, a heavy-press operation.

19. The method as claimed in claim 1, wherein the preset operation comprises one of the following: a pick up operation, a discarding operation, a dialogue operation, an opening operation, a closing operation.

20. An information processing apparatus, provided by executing a software application on a processor of a mobile terminal and rendering a graphical user interface on a touch display screen of the mobile terminal, contents displayed by the graphical user interface at least partially comprising a game scene and at least partially comprising a virtual character, the apparatus comprising:
    a first providing element, configured to provide a motion controller on the graphical user interface, the motion controller comprising an area assisting object and an operation assisting object of which an initial position is within a range of the area assisting object;
    a first detection element, configured to control, detecting when a touch sliding operation acting on the operation assisting object, the operation assisting object to move along a motion track of a touch point of the touch sliding operation within a predetermined range, and control the virtual character to move in the game scene according to a movement of the operation assisting object;
    a second detection element, configured to configure, when detecting a preset interaction object exists within a preset distance from the virtual character in the game scene, the operation assisting object to be a temporary interaction control; and
    a third detection element, configured to control, when detecting an interaction triggering operation on the temporary interaction control, the virtual character to perform a preset operation on the preset interaction object.

* * * * *